United States Patent
DeHaan et al.

(10) Patent No.: US 8,166,341 B2
(45) Date of Patent: Apr. 24, 2012

(54) SYSTEMS AND METHODS FOR TESTING RESULTS OF CONFIGURATION MANAGEMENT ACTIVITY

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 125 days.

(21) Appl. No.: 12/551,458

(22) Filed: Aug. 31, 2009

(65) Prior Publication Data

US 2011/0055636 A1    Mar. 3, 2011

(51) Int. Cl.
G06F 11/00    (2006.01)
(52) U.S. Cl. .................. 714/21; 714/38.14; 714/49
(58) Field of Classification Search ............... 714/21, 714/37, 38.14, 49
See application file for complete search history.

(56) References Cited

U.S. PATENT DOCUMENTS

| | | | |
|---|---|---|---|
| 6,154,128 A | 11/2000 | Wookey et al. | |
| 6,263,455 B1 * | 7/2001 | Bannister | 714/25 |
| 6,327,677 B1 * | 12/2001 | Garg et al. | 714/37 |
| 6,529,784 B1 | 3/2003 | Cantos et al. | |
| 6,636,521 B1 | 10/2003 | Giulianelli | |
| 6,721,880 B1 | 4/2004 | Pike | |
| 6,915,457 B1 * | 7/2005 | Miller | 714/43 |
| RE39,717 E | 7/2007 | Yates et al. | |
| 7,373,553 B2 * | 5/2008 | Tripp et al. | 714/37 |
| 7,441,021 B1 | 10/2008 | Perry | |
| 7,660,824 B2 | 2/2010 | Halpern et al. | |
| 7,693,966 B2 * | 4/2010 | Schmid | 709/220 |
| 7,769,990 B1 | 8/2010 | Okcu et al. | |
| 7,856,496 B2 | 12/2010 | Kline | |
| 7,865,578 B1 | 1/2011 | Gerraty | |
| 2002/0184349 A1 | 12/2002 | Manukyan | |
| 2003/0055931 A1 | 3/2003 | Cravo De Almeida et al. | |
| 2003/0061323 A1 | 3/2003 | East et al. | |
| 2003/0120754 A1 | 6/2003 | Muto et al. | |
| 2003/0177412 A1 * | 9/2003 | Todd | 714/25 |
| 2003/0208589 A1 * | 11/2003 | Yamamoto | 709/224 |
| 2004/0006546 A1 * | 1/2004 | Wedlake et al. | 706/46 |
| 2004/0025086 A1 * | 2/2004 | Gorday et al. | 714/37 |
| 2004/0032625 A1 | 2/2004 | Yamano | |
| 2004/0034577 A1 | 2/2004 | Van Hoose et al. | |
| 2004/0198319 A1 | 10/2004 | Whelan et al. | |
| 2004/0230828 A1 | 11/2004 | DeFuria et al. | |
| 2005/0066218 A1 | 3/2005 | Stachura et al. | |
| 2005/0198196 A1 | 9/2005 | Bohn et al. | |
| 2006/0004806 A1 | 1/2006 | Kraft | |
| 2006/0031188 A1 | 2/2006 | Lara et al. | |

(Continued)

*Primary Examiner* — Joshua Lohn
(74) *Attorney, Agent, or Firm* — Lowenstein Sandler PC

(57) ABSTRACT

Embodiments relate to systems and methods for testing results of configuration management activity. In embodiments, a configuration management server can control and maintain the configuration state of one or more targets, hosts, servers, clients, or other machines in a managed. In aspects, a testing tool hosted on the configuration management server can verify the correct implementation of configuration instructions. In embodiments, the testing tool can access or receive an anticipated or target configuration state for one or more target(s) or other machines, indicating the status of services, memory, security, storage, and/or other configuration parameters after a selected configuration command is to be transmitted and run on the recipient machine. After the configuration change or update is performed, the test tool can receive results indicating the actual configuration state achieved after running the configuration management command(s), and compare those to the anticipated configuration state. Any discrepancies can be flagged, and corrective commands can be issued.

20 Claims, 4 Drawing Sheets

U.S. PATENT DOCUMENTS

| | | |
|---|---|---|
| 2006/0050862 A1 | 3/2006 | Shen et al. |
| 2006/0075294 A1 | 4/2006 | Ma et al. |
| 2006/0161444 A1 | 7/2006 | Lubrecht et al. |
| 2007/0005661 A1 | 1/2007 | Yang |
| 2007/0027936 A1 | 2/2007 | Stakutis et al. |
| 2007/0038679 A1 | 2/2007 | Ramkumar et al. |
| 2007/0074077 A1 | 3/2007 | Markow et al. |
| 2007/0121527 A1 | 5/2007 | Zhou et al. |
| 2007/0266124 A1 | 11/2007 | Kinyon et al. |
| 2007/0288530 A1 | 12/2007 | Romem et al. |
| 2008/0016186 A1 | 1/2008 | Ball |
| 2008/0091466 A1 | 4/2008 | Butler et al. |
| 2008/0209033 A1 | 8/2008 | Ginter et al. |
| 2008/0219563 A1 | 9/2008 | Moroney |
| 2008/0244047 A1 | 10/2008 | Yeung et al. |
| 2009/0070442 A1 | 3/2009 | Kacin et al. |
| 2009/0132698 A1 | 5/2009 | Barnhill, Jr. |
| 2009/0172477 A1* | 7/2009 | Mukaigawa et al. ........... 714/47 |
| 2009/0193413 A1 | 7/2009 | Lee |
| 2009/0276620 A1 | 11/2009 | McCarron et al. |
| 2009/0276772 A1 | 11/2009 | Garrett et al. |
| 2009/0300180 A1 | 12/2009 | DeHaan et al. |
| 2010/0077076 A1 | 3/2010 | Wada |
| 2010/0088197 A1 | 4/2010 | DeHaan |
| 2010/0131625 A1 | 5/2010 | DeHaan |
| 2010/0185590 A1 | 7/2010 | D'Angelo et al. |
| 2010/0198964 A1 | 8/2010 | Tanaka |
| 2010/0218014 A1 | 8/2010 | Bozek et al. |
| 2010/0223274 A1 | 9/2010 | DeHaan |
| 2010/0223375 A1 | 9/2010 | DeHaan |
| 2010/0275064 A1* | 10/2010 | DeCusatis et al. ............. 714/37 |
| 2010/0306334 A1 | 12/2010 | DeHaan |
| 2010/0306347 A1 | 12/2010 | DeHaan |
| 2010/0306359 A1 | 12/2010 | DeHaan |
| 2011/0047414 A1* | 2/2011 | Kudo et al. .................... 714/37 |
| 2011/0055361 A1 | 3/2011 | DeHaan |
| 2011/0055636 A1* | 3/2011 | DeHaan et al. ................ 714/37 |
| 2011/0055669 A1 | 3/2011 | DeHaan |
| 2011/0055810 A1 | 3/2011 | DeHaan |
| 2011/0078301 A1 | 3/2011 | DeHaan |
| 2011/0107299 A1 | 5/2011 | DeHaan |

* cited by examiner

SYSTEMS AND METHODS FOR TESTING RESULTS OF CONFIGURATION MANAGEMENT ACTIVITY

FIELD

The present teachings relate to systems and methods for testing results of configuration management activity, and more particularly to platforms and techniques for testing and verifying the results of configuration management updates and other activity performed on network targets or other devices to ensure that the intended services, configuration settings, and other aspects of the desired configuration state have been achieved.

BACKGROUND OF RELATED ART

A variety of known configuration management platforms exist which permit a systems administrator or other user to interrogate, inventory, and/or install or update configurations of machines in a network. The configuration management platform may, for instance, communicate with one or more targets or other machines in a network to check and update the set of network services, installed software applications, memory or storage resources, or other resources configured on that set of machines.

When performing configuration management operations, the configuration management server and related logic of known platforms can update or install a configuration to a target machine using scripts or other messaging or code to access, identify, and/or install or update desired configuration settings. Various security and/or integrity checks can be performed as part of known processes to ensure that the selected configuration changes are effected. However, existing configuration management platforms do not incorporate a capability to verify the resulting operational effects, once a configuration update is completed. That is, while a desired configuration change, such as a change to a library on a target machine, can be carried out, in cases that configuration event can trigger a set of unintended or unexpected consequences. For instance, once the library is updated, the target machine may have an associated service turned off that was previously operating, for instance, due to faulty or malicious code that was part of the configuration chance. Other effects, such as a change in memory or storage allocation, can occur which indicate a configuration fault that exists as a result of the configuration update.

It may be desirable to provide systems and methods for testing results of configuration management activity, in which not merely a desired configuration setting, but potential ensuing configuration faults and/or other conditions that result from that activity can flagged and identified for correction or other treatment.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for testing results of configuration management activity. More particularly, embodiments related to platforms and techniques for the automatic testing and verification of the configuration and operational effects of a configuration management update, installation, and/or other configuration events, operations, or processing. In various embodiments, a configuration management server can communicate with various machines in a managed network, such as hosts, servers, clients, targets, and/or other machines, nodes, or devices. In embodiments, the configuration management server can transmit one or more configuration management commands, instructions, data, scripts, code, and/or other information to the machine or machines whose configuration is to be set, configured, installed, updated, or otherwise managed. As part of the complement of logic and other resources hosted by configuration management server, in embodiments, the configuration management server can also host or access a testing tool configured to test, verify, interrogate, and manage a configuration state of a target or other machine whose configuration is being adjusted or processed.

In embodiments in various regards, the testing tool can receive, access, and/or generate a target or anticipated configuration state related to a subject machine which reflects the predicted or targeted state of the configuration of that machine, once one or more configuration commands are carried out on that machine. Thus, for instance, a configuration command may contain instructions to turn off or turn on a given network service, and the target or anticipated configuration state may therefore reflect a flag or projected state for that service to be terminated or de-activated upon completion of the corresponding configuration management command.

Testing tool and/or the configuration management server hosting the tool can collect results of the configuration event indicating the state of memory, software, storage, services, and/or other resources of the subject machine and compare the operational results of performing the configuration management activity against the predicted or targeted results. If discrepancies between the target state and actual configuration results exist, a configuration fault or other condition can be declared. In embodiments, the configuration management server, and/or testing tool via that server, can issue one or more additional and/or corrective configuration commands, to remedy or otherwise address the configuration fault condition, and restore proper operation to the subject machine.

Reference will now be made in detail to exemplary embodiments of the present teachings, which are illustrated in the accompanying drawings. Where possible the same reference numbers will be used throughout the drawings to refer to the same or like parts.

Figure 1:
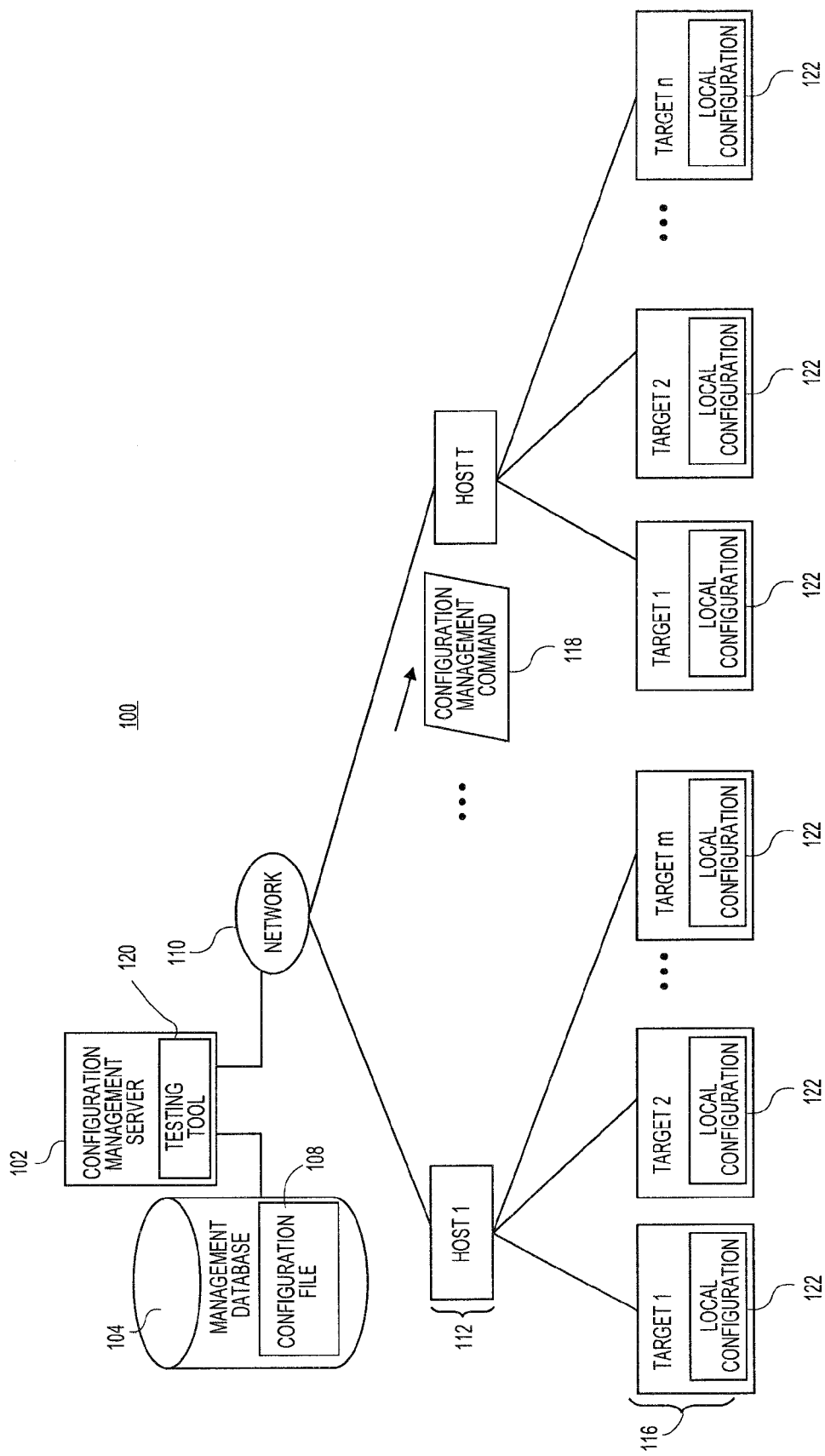
FIG. 1 illustrates an overall network in which systems and methods for testing results of configuration management activity can be implemented, according to various embodiments.

FIG. 1 illustrates an overall network 100 in which systems and methods for testing results of configuration management activity can be implemented, according to various embodiments of the present teachings. In embodiments as shown, a configuration management server 102 can communicate with a managed network 110 to carry out various machine configuration, detection, management, deployment, maintenance, or other services. In embodiments, configuration management server 102 can communicate with managed network 110 via secure or non-secure channels or connections, including, for instance, the Internet or other public or private networks. In embodiments, configuration management server 102 can host, maintain, or communicate with a set of associated resources including a management database 104, which can be or include a local or remote database or data store hosting information related to a set of hosts 112, a set of target machines 116, and/or other machines or nodes hosted in managed network 110. In embodiments, configuration management server 102 can comprise, host, or access a testing tool 120 containing applications, logic, and/or other resources to receive, filter, detect, analyze, store, and manage data related to the configuration management of machines in managed network 110, including set of hosts 112 and set of target machines 116, using configuration management commands exchanged with and configuration state data captured from those subject machines.

Managed network 110 can include or host a set of resources including set of hosts 112, a set of targets 116, and/or other nodes, machines, or resources. In embodiments, set of hosts 112, set of targets 116, and/or other nodes or resources of managed network 110 can be or include virtual machines, as well as hardware-based or hardware-implemented machines. In embodiments, set of hosts 112, set of targets 116 and/or other resources of managed network 110 can be or include resources instantiated from or based on cloud-based networks. Set of hosts 112, set of targets 116, and/or other nodes or machines can be or include, for example, server machines, client machines, portable computing devices, wireless communication devices, and/or other clients, machines, or devices.

More particularly, according to various embodiments, modeling client 102 can communicate with one or more machine in managed network 110 to transmit one or more configuration management command 118 to that subject machine or machines, and carry out an initial configuration setting and/or update to existing configuration settings. In embodiments, one or more configuration management command 118 can be or include instructions, commands, scripts, applets, code, data, and/or other information to set up or update any configuration setting on the subject machine or machines, such as, for instance, settings related to network-based services, software applications, operating systems, communications resources, security and/or user authorization settings, and/or other settings related to the hardware, software, and/or other resources of the subject machine(s). In aspects, a set of configuration settings for one or more machines in managed network 110 can be stored in management database 104, which can include a configuration file 108 storing configurations for machines under management in managed network 110. In aspects, for illustrative purposes, machines in set of targets 116 are shown each having or storing a local configuration 122, but hosts in set of hosts 112, other servers, hosts, targets, clients, and/or other machines, nodes or resources (e.g., databases) can all contain or maintain an associated local configuration 122 or similar data. modeling client 102 can, in general aspects, effect any desired configuration settings, installations, and/or updates in managed network 110 via configuration management command 118, on a selective, group, or inclusive basis in terms of machines to be processed, and configuration management activity can take place based on user initiation, based on automatic events, conditions, or times, and/or based on other criteria. In general, according to various embodiments, results 132 can be examined via testing tool 120 to identify any configuration faults or other irregular or unanticipated conditions resulting from the execution of one or more configuration management command 118.

Figure 2:
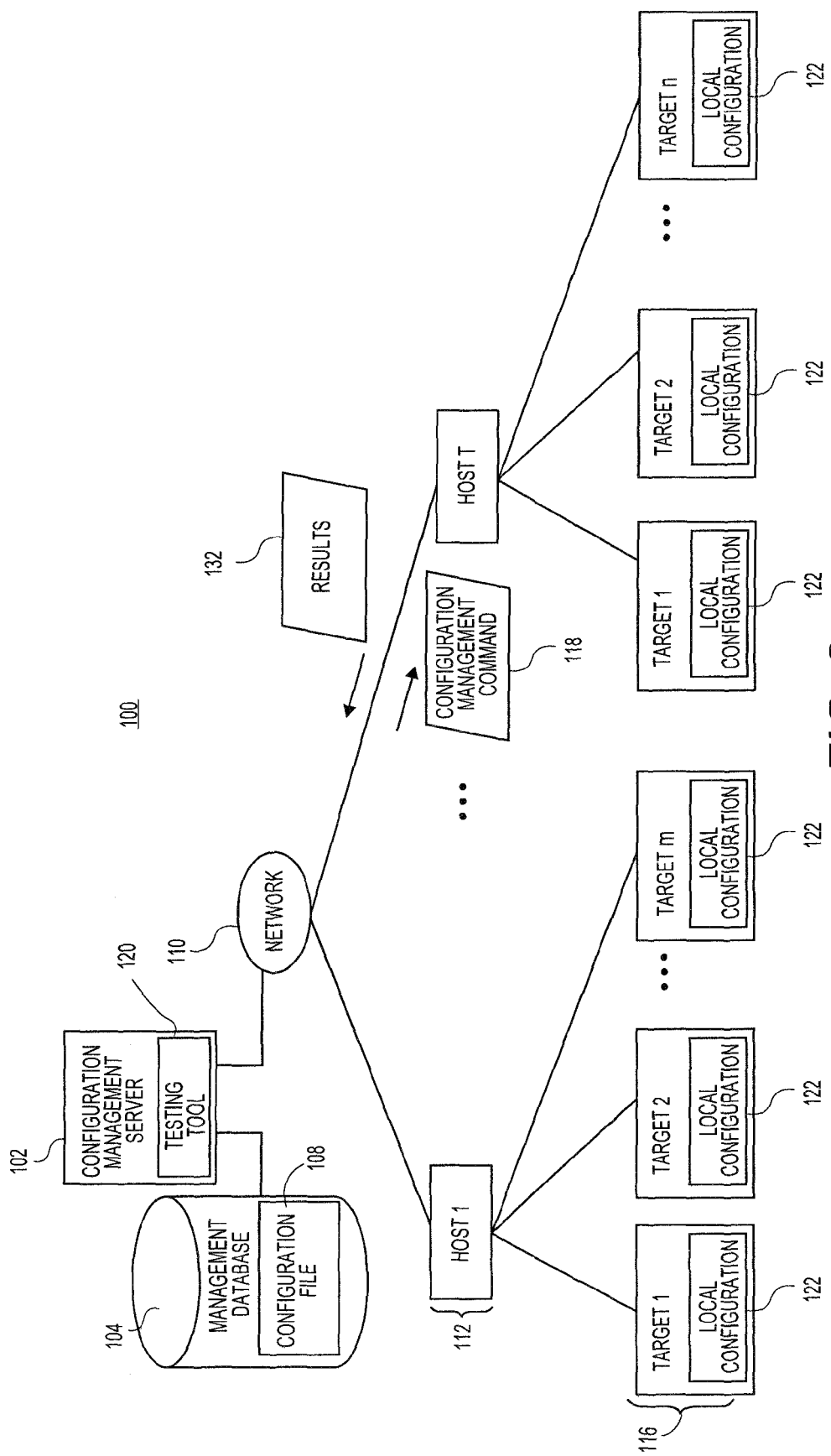
FIG. 2 illustrates an overall network in which systems and methods for testing results of configuration management activity can implemented, according to various embodiments in further regards.

More particularly, according to various embodiments, and as shown for instance in FIG. 2, once configuration management command 118 has been transmitted to one or more subject machine, such as one or more targets in set of targets 116, one or more hosts in set of hosts 112, and/or other machines or nodes, testing tool 120 hosted in or associated with modeling client 102 can receive set of results 132 indicating a configuration state of the subject machines after configuration management activity effected by configuration management command 118 has taken place. In embodiments, results can indicate the configuration state of various resources in the subject machine, including, as noted, the state of network-based services, installed software, memory management, storage allocation, and/or other configuration parameters. In aspects, results 132 can be compared to a set of anticipated or target configuration results that are expected to result from execution of one or more configuration management command 118. The anticipated configuration results can be stored in configuration file 104, and can reflect the resulting state from installation or update of services, software, and/or other resources under normal conditions. For further instance, if one or more configuration management command 118 include a script or recipe to configure an Apache™ server and/or install a Web site update, certain locations on disk storage and certain services or processes can be expected to be restarted. In embodiments, testing tool 120 can detect any discrepancy or difference between the anticipated or target configuration state, and the configuration state of one or more subject machine reflected in results 132. For example, results 132 can indicate that a service is running on a target machine that is not anticipated to be running after a configuration update. For instance, if one or more configuration management command 118 modifies services or applications such as "/var" and "/etc", but results 132 indicate an update to "/usr", a fault can be flagged. In aspects, this may, for example, indicate a bug, the operation of a virus or other malicious software, a hardware conflict, and/or other configuration faults or conditions. In embodiments, testing tool 120 can record the configuration fault and other data to configuration file 108, for auditing, bug-fixing, and/or other purposes. In embodiments, for instance testing tool 120 and/or modeling client 102 can respond to any detected faults or other conditions by issuing one or more additional configuration management command 118, for example, to correct or remedy the detected fault. For instance, a service can be terminated or user access can be restricted. Other responses can be made. In aspects, any responses to detected configuration faults can be flagged for presentation to a user, and/or automated responses or instructions can be made via modeling client 102 and/or testing tool 120.

Figure 3:
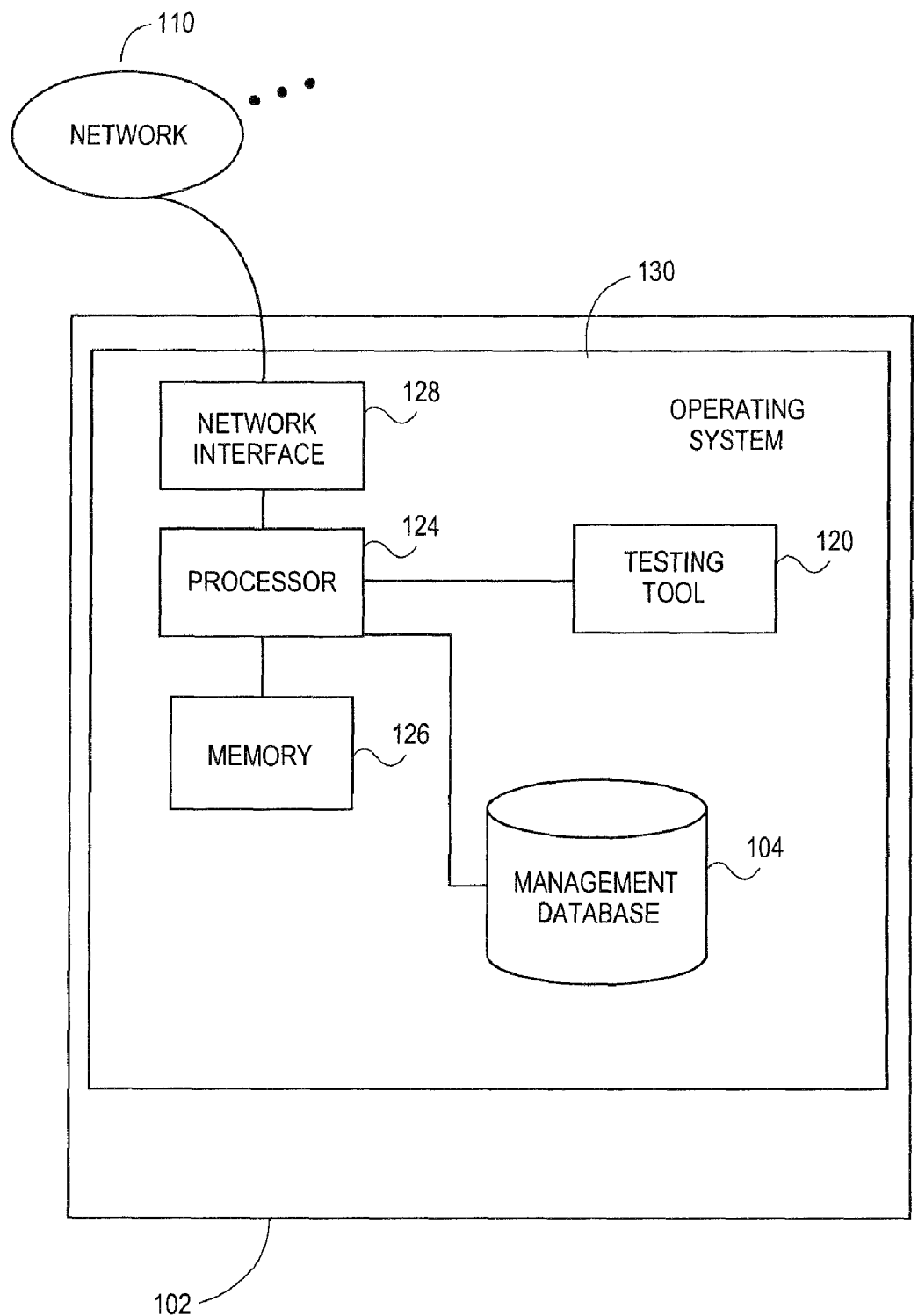
FIG. 3 illustrates an exemplary hardware configuration of a configuration management server and associated resources, according to various embodiments.

FIG. 3 illustrates an exemplary diagram of hardware and other resources that can be incorporated in a configuration management server 102 configured to communicate with managed network 110 to conduct configuration operations on machines including set of target machines 116, set of hosts 112, and/or other devices, nodes, or resources, according to embodiments. In embodiments as shown, the configuration management server 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a monitoring database 104, such as a database stored on a local hard drive. Processor 124 further communicates with network interface 128, such as an Ethernet or wireless data connection, which in turn communicates with one or more managed network 110, which can be, include, or be accessed with via private or secure channels, and/or the Internet or other public or private networks. Processor 124 also communicates with testing tool 120 and/or other resources or logic, to execute verification, testing, monitoring, control, messaging, and other management processes related to configuration management and other operations described herein. Other configurations of the management server 102, associated network connections, and other hardware and software resources are possible. While FIG. 3 illustrates configuration management server 102 as a standalone system which comprises a combination of hardware and software, configuration management server 102 and its components or resources can also be implemented as a software application or program capable of being executed by a conventional computer platform. Likewise, management server 102 can also be implemented as a software module or program module capable of being incorporated in other software applications and programs. In either case, management server 102 can be implemented in any type of conventional proprietary or open-source computer language.

Figure 4:
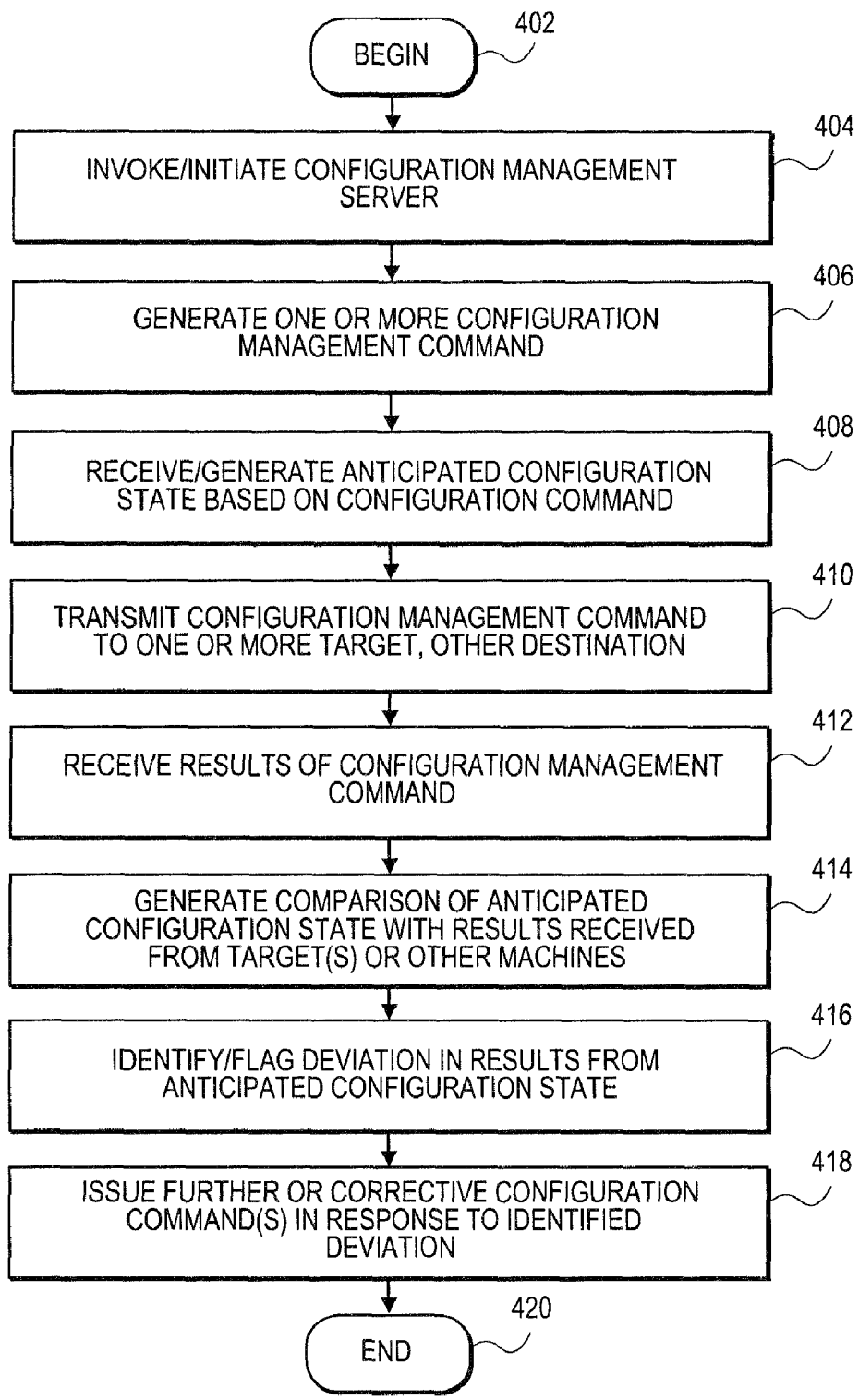
FIG. 4 illustrates a flowchart of configuration and testing processing that can be used in systems and methods for testing results of configuration management activity, according to various embodiments.

FIG. 4 illustrates a flowchart of overall processing that can be used in systems and methods for testing results of configuration management activity, according to various embodiments. In 402, processing can begin. In 404, modeling client 102 and related resources can be invoked or instantiated, for instance by user selection. In 406, one or more configuration management command 118 can be generated via modeling client 102. configuration management command 118 can be or include, for instance, a command or instruction to turn a service on or off, or to establish or verify security conditions on a target in set of targets 116, hosts in set of hosts 112, and/or other machine or node. configuration management command 118 can likewise be or include, for example, commands or instructions related to storage configuration, access privileges, memory management, ports or other communications resources or assignments, and/or other resources or configuration settings. In 408, testing tool 120 hosted in modeling client 102 can receive and/or generate an anticipated or target configuration state based on the one or more configuration management command 118. In embodiments, for instance, the anticipated or target configuration state can include a flag or indication that a certain service or services should be running, or should not be running, after implementation of configuration management command 118. In embodiments, for further instance, the anticipated or target configuration state can include a flag or indication that a certain set of files on the target(s) or other subject machines should show an update to certain version. Other configuration settings or details can be reflected or incorporated in the anticipated or target configuration state. In embodiments, the anticipated or target configuration state can be supplied by user input, and/or can be generated by testing tool 120 and/or other logic or services. In embodiments, the anticipated or target configuration state can be stored in configuration file 108 of management database 104, or in other memory or storage.

In 410, testing tool 120 can transmit configuration management command 118 to one or more target in set of targets 116, one or more hosts in set of hosts 112, and/or to other machines, nodes, or destinations. In 412, testing tool 120 can receive the results 132 of configuration management command 118 back from the subject target or other machine. In embodiments, results 132 can be or include a snapshot or inventory of the configuration state of the subject machine after implementing configuration management command 118. In 414, testing tool 120 can generate a comparison of the anticipated or target configuration state with the configuration state reflected in results 132 received from the one or more target(s) and/or other machines being subjected to configuration management processing. In 416, testing tool 120 can flag or identify any deviation(s) in the configuration state reflected in results 132 compared to the anticipated or target configuration state inputted by the user and/or accessed or generated via testing tool 120. In 418, modeling client 102 can issue one or more further or corrective configuration management command 118, based on the detection of any deviations or anomalies in the results, as appropriate. For instance, a service that was not anticipated to be running upon completion of the configuration management update or processing can be turned off, or a service that was targeted to be running but was not detected, can be turned on. In 420, processing can repeat, return to a prior processing point, jump to a further processing point, or end.

The foregoing description is illustrative, and variations in configuration and implementation may occur to persons skilled in the art. For example, while embodiments have been described which operate in a network incorporating one management server 102 communicating with managed network 110, in embodiments, more than management server 102 or related hosts can be used. Likewise, while embodiments have been described in which one target in set of targets 116 is subject to configuration management and verification processing, in embodiments, more than one machine and/or more than one type of machine (target, host, client, server, etc.) can be subjected to configuration management and verification processing at the same time, one after the other, or otherwise in conjunction with each other. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of testing an implementation of configuration management activities in a network, comprising:
    adjusting a configuration of at least one target machine by transmitting at least one configuration management command to the at least one target machine to be executed on the at least one target machine, wherein adjusting the configuration of the at least one target machine generates configuration results for the at least one target machine indicating an adjusted state of a corresponding adjusted target machine; and
    in response to adjusting the configuration of the at least one target machine, comparing the adjusted state of the at least one adjusted target machine to a target predicted configuration state for the at least one target machine to determine whether discrepancies exist between the adjusted state of the at least one adjusted target machine and the predicted configuration state to indicate a configuration fault condition exists in the at least one adjusted target machine.

2. The method of claim 1, wherein the configuration fault condition comprises at least one of an activated service fault, a security fault, a memory management fault, a storage management fault, a library fault, an application fault, a file version fault, or a user authorization fault.

3. The method of claim 2, wherein the configuration fault condition comprises an activated service fault, and the activated service fault comprises at least one of at least one detected running service not specified in the predicted configuration state or at least one undetected service specified in the predicted configuration state.

4. The method of claim 3, further comprising issuing a further corrective configuration command from a configuration management server to a corresponding adjusted target machine based on results of the determination of whether a fault condition exists.

5. The method of claim 4, wherein the further corrective configuration command comprises at least one of
   at least one command to turn off the at least one detected running service on the at least one adjusted target machine not specified in the predicted configuration state, or
   at least one command to turn on the at least one service not running on the at least adjusted predicted machine specified in the predicted configuration state.

6. The method of claim 1, wherein the predicted configuration state comprises at least one of a configuration state specification supplied by a user or a configuration state specification generated by a testing tool.

7. The method of claim 1, wherein the at least one target machine comprises at least one of a server, a host, or a client.

8. The method of claim 1, wherein the comparison is performed via a testing tool hosted in a configuration management server.

9. The method of claim 1, further comprising storing a record of the at least one executed configuration management command to a configuration file.

10. A configuration management system, comprising:
   an interface to a set of target machines in a network; and
   a testing tool, communicating with the set of target machines via the interface, the testing tool being configured to
   adjust a configuration of at least one target machine by transmitting at least one configuration management command to the at least one target machine to be executed on the at least one target machine, wherein adjusting the configuration of the at least one target machine generates configuration results for the at least one target machine indicating an adjusted state of a corresponding adjusted target machine,
   in response to adjusting the configuration of the at least one target machine, compare the adjusted state of the at least one adjusted target machine to predicted configuration state for the at least one target machine to determine whether discrepancies exist between the adjusted state of the at least one adjusted target machine and the predicted configuration state to indicate a configuration fault condition exists in the at least one adjusted target machine based on the comparison.

11. The system of claim 10, wherein the configuration fault condition comprises at least one of an activated service fault, a security fault, a memory management fault, a storage management fault, a library fault, an application fault, a file version fault, or a user authorization fault.

12. The system of claim 11, wherein the configuration fault condition comprises an activated service fault, and the activated service fault comprises at least one of at least one detected running service not specified in the predicted configuration state or at least one undetected service specified in the predicted configuration state.

13. The system of claim 12, wherein the testing tool is further configured to issue a further corrective configuration command via the configuration management system to a corresponding adjusted target machine based on results of the determination of whether a fault condition exists.

14. The system of claim 13, wherein the further corrective configuration command comprises at least one of
   at least one command to turn off the at least one detected running service on the at least one adjusted target machine not specified in the predicted configuration state, or at least one command to turn on the at least one service not running on the at least one adjusted target machine specified in the predicted configuration state.

15. The system of claim 10, wherein the predicted configuration state comprises at least one of a configuration state specification supplied by a user or a configuration state specification generated by a testing tool.

16. The system of claim 10, wherein the at least one target machine comprises at least one of a server, a host, or a client.

17. The system of claim 10, wherein the testing tool is hosted in a configuration management server.

18. The system of claim 10, wherein the testing tool is further configured to store a record of the at least one executed configuration management command to a configuration file.

19. A computer readable storage medium including instructions that, when executed by a processor, cause the processor to perform a method comprising:
   adjusting, by the processor, a configuration of at least one target machine by transmitting at least one configuration management command to the at least one target machine to be executed on the at least one target machine, wherein adjusting the configuration of the at least one target machine generates configuration results for the at least one target machine indicating an adjusted state of a corresponding adjusted target machine; and
   in response to adjusting the configuration of the at least one target machine, comparing the adjusted state of the at least one adjusted target machine to a predicted configuration state for the at least one target machine to determine whether discrepancies exist between the adjusted state of the at least one adjusted target machine and the predicted configuration state to indicate a configuration fault condition exists in the at least one adjusted target machine.

20. The computer readable storage medium of claim 19, wherein the predicted configuration state comprises at least one of a predicted configuration state entered by a user or a predicted configuration state generated via a testing tool.

* * * * *